Jan. 10, 1961 P. D. FRIDAY 2,967,568
CONTINUOUS IN LINE PULP MOLDING MACHINE
Filed Aug. 5, 1957 8 Sheets-Sheet 1

Fig. 1

INVENTOR.
PAUL D. FRIDAY
BY
Cook and Schermerhorn
Attorneys

INVENTOR.
PAUL D. FRIDAY
BY
Cook and Schermerhorn
Attorneys

Jan. 10, 1961 P. D. FRIDAY 2,967,568
CONTINUOUS IN LINE PULP MOLDING MACHINE
Filed Aug. 5, 1957 8 Sheets-Sheet 4

INVENTOR.
PAUL D. FRIDAY
BY
Cook and Schermerhorn
Attorneys

Jan. 10, 1961

P. D. FRIDAY 2,967,568

CONTINUOUS IN LINE PULP MOLDING MACHINE

Filed Aug. 5, 1957

INVENTOR.
PAUL D. FRIDAY
BY
Cook and Schermerhorn
Attorneys

INVENTOR.
PAUL D. FRIDAY
BY
Cook and Schermerhorn
Attorneys

United States Patent Office 2,967,568
Patented Jan. 10, 1961

2,967,568

CONTINUOUS IN LINE PULP MOLDING MACHINE

Paul D. Friday, Portland, Oreg., assignor to Paper Maid, Inc., Portland, Oreg., a corporation of Oregon Filed Aug. 5, 1957, Ser. No. 676,152

22 Claims. (Cl. 162—407)

This invention relates to improvements in machines for manufacturing articles from pulp or the like.

An important object of the invention is to provide a machine which will operate automatically to produce molded articles from pulp in a more efficient and expeditious manner than prior devices.

Another object is to provide an improved pulp molding machine of economical construction which is rugged and reliable in operation and which requires a relatively small floor space for its installation.

Another object is to provide a machine of the type described without valves to avoid many operating difficulties of conventional machines.

Another object of the invention is to provide a pulp molding machine having an improved carrier mechanism for moving a continuous series of transfer and forming die holders through various positions in straight line movement for forming pulp material into finished articles.

Another object is to provide a pulp molding machine in which the female or forming die holders are maintained in horizontal position during the deposit of the pulp and throughout the forming period.

Another object is to provide means for lowering the transfer dies closely adjacent the drying tunnel conveyor belt while moving in the same direction at synchronous speed and retracting the dies off the molded product without causing distortion of the fragile product during transfer to the conveyor belt.

Another object is to provide a molding machine having improved transfer and forming die holders and associated mechanism for forming pulp articles.

Another object is to provide a pulp molding machine having an improved vacuum system associated with transfer and forming die holders for dehydrating the pulp material and transferring formed articles from the forming to the transfer dies.

Another object is to provide in a pulp molding machine a vacuum system utilizing elongated rigid vacuum supply means which supplies sub-atmospheric or suction pressure to a plurality of die holders during rectilinear travel.

Another object is to provide a machine of the type described in which the forming vacuum is enhanced by falling water in a gravity water disposal system.

Another object is to provide, in addition to a vacuum system, air pressure to assist in the transfer of the article from the forming dies to the transfer dies and to remove the articles from the transfer dies.

Another object is to provide improved vacuum sealing means between the vacuum system and the traveling die holders.

Another object is to provide washing means for the dies so arranged that the wash water will not dilute the furnish.

Another object is to provide a pulp molding machine wherein the transfer dies calender the rough surface of the molded articles.

Another object is to provide an improved apparatus for molding a laminated article.

Another object is to provide novel furnish supply means utilizing multiple tanks containing different grades of furnish whereby forming dies moving thereunder may receive charges of one or more different grades of said furnish.

The invention resides in a machine employing a first carrier mechanism for a continuous series of female or forming die holders and a second carrier mechanism for a continuous series of male or transfer die holders. The carrier for the forming die holders comprises pairs of end sprockets and a pair of spaced, endless chains movable around the sprockets. The portions of the chains between the end sprockets form longitudinal run portions, and each of the chains is equipped with supporting rollers engageable on horizontal tracks secured in positions adjacent said longitudinal run portions of the chain. These chains carry therebetween a continuous series of the forming die holders which move under improved means for supplying furnish thereto, and associated with these holders is an elongated vacuum bar having suction means which serves to subject the forming dies to suction during travel on the tracks.

The structure of the second carrier is similar to that of the first carrier, and this carrier is disposed above the first carrier in longitudinal parallelism therewith and in partial overlapping relationship. In this overlapped portion the transfer die holders are arranged to move downwardly to place transfer dies into firm contact with forming dies for forming the pulp article. This contact is maintained for a time sufficient to calender the rough surface of the article. A vacuum bar is also associated with the transfer die holders and serves to provide suction to transfer the formed articles from the forming dies to the transfer dies. Improved sealing means are provided between the vacuum bars and their respective die holders and, in addition, each of the vacuum bars has pressured air means arranged to blow off at predetermined stations the articles from the two die holders.

The steps of forming the molded articles comprise introducing a furnish into the forming dies, subjecting the forming dies to a suction step while said forming dies and their holders are being carried in a straight line run portion of their carriers, closing the molds while moving in the straight line run portion by lowering the transfer die holders so that the transfer dies come into contact with the forming dies, transferring the compressed articles to the transfer dies by releasing the suction in the forming dies and introducing suction to the transfer dies, and subsequently releasing the suction to the transfer dies and transferring the formed articles to a conveyor leading into a drying chamber.

The invention will be better understood and additional objects and advantages will become apparent from the following description taken in connection with the accompanying drawings which illustrate preferred forms of the invention. It is to be understood, however, that the invention may take still other forms and that all such modifications and variations within the scope of the appended claims, which will occur to persons skilled in the art are included in the invention.

*Embodiment in Figures 1–12*

Figure 1:
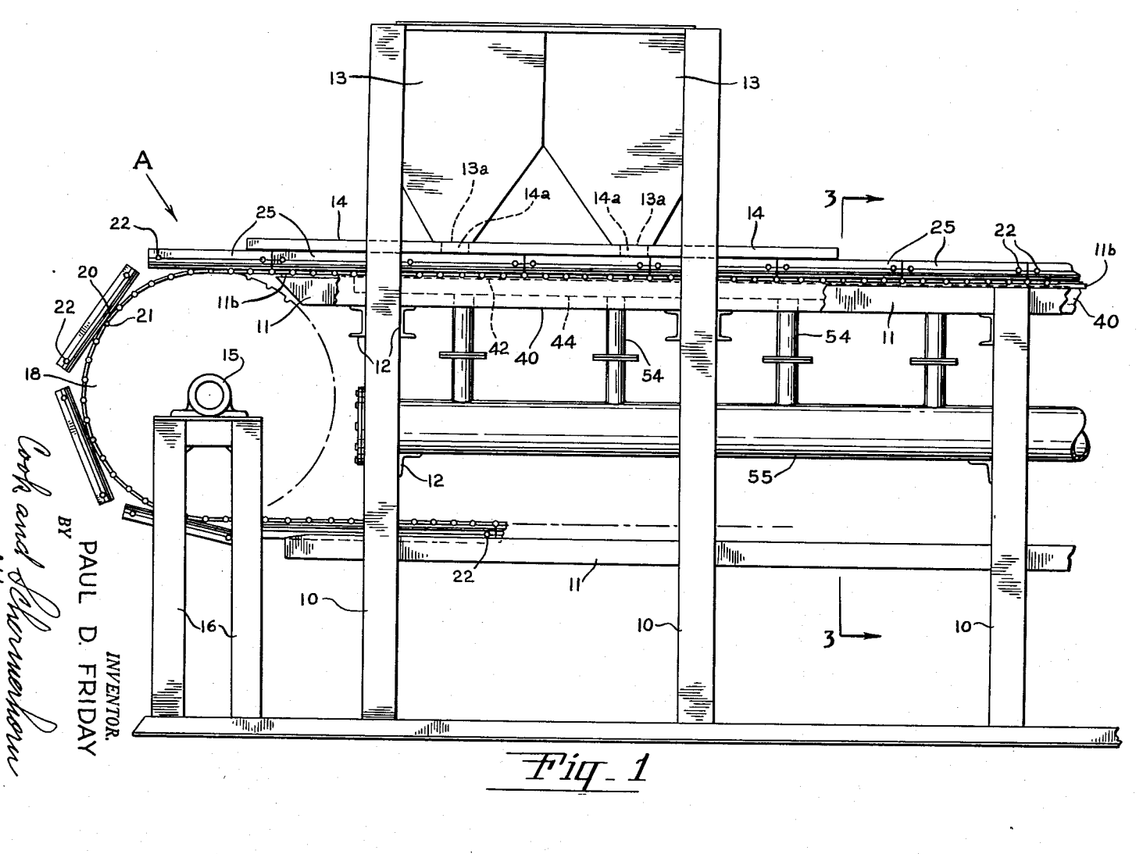
Figure 1 is a side elevational view of a portion of one form of the present machine.
Figure 2:
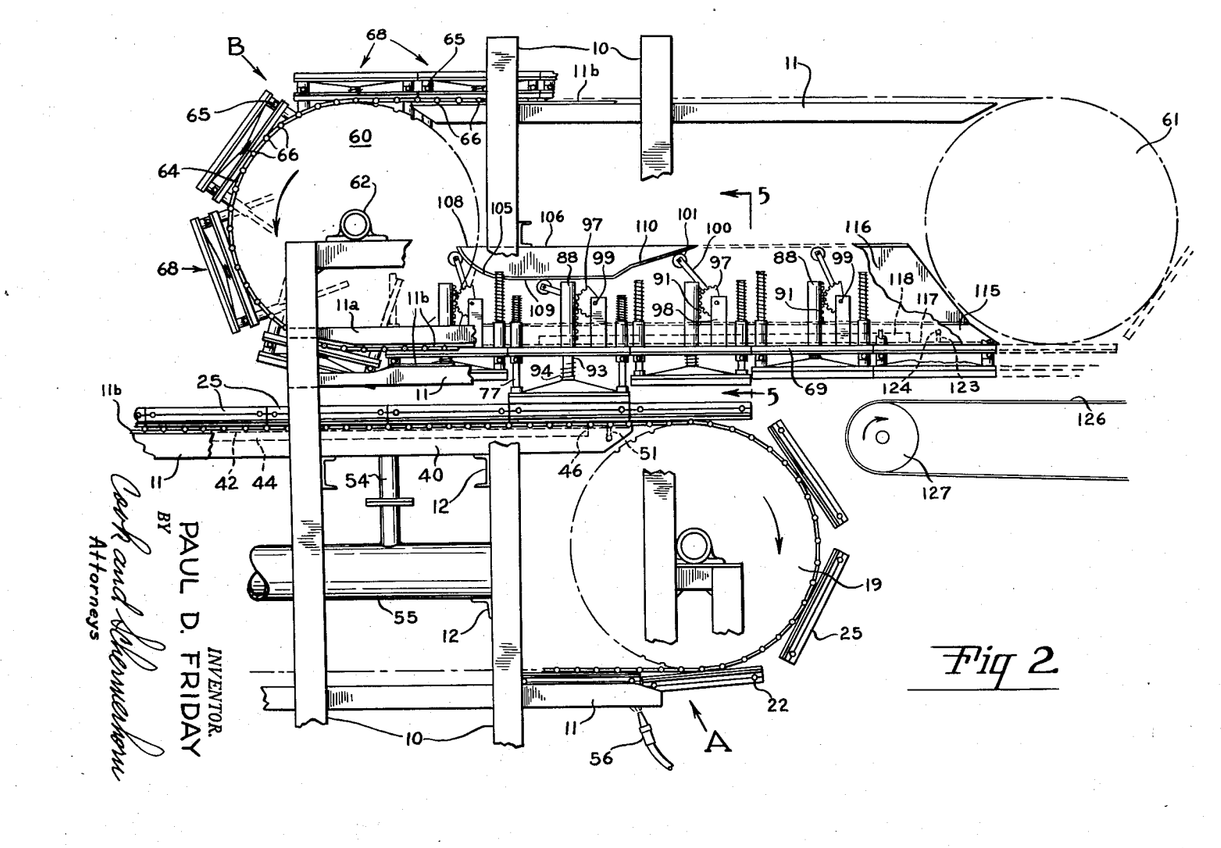
Figure 2 is a side elevational view of the remaining portion of the machine of Figure 1.

One form of the present machine is shown in Figures 1 through 12, and, to view the machine as a whole, Figure 2 should be placed to the right of Figure 1 and these figures viewed together. Figure 1 shows the front portion of the machine comprising a lower section A, and Figure 2 shows the rear portion comprising an upper section B and also a portion of the lower section A extending over into this figure.

The framework for the machine comprises a plurality of upright frame members 10, longitudinal frame members 11, and transverse frame members 12. Some of the upright members 10 in the front portion of the machine project upwardly and support vats or tanks 13 containing a supply of pulp material suspended in liquid, commonly known as furnish. The vats 13 have discharge openings 13a, and disposed at the bottom of the vats is a horizontal wall 14 having orifices 14a in communication with openings 13a. Wall 14 extends between the vats 13 and also projects longitudinally of the machine on opposite sides of the vats. Some of the upright frame members 10 in the rear portion of the machine also project upwardly and support the upper section B vertically above a portion of the section A in overlapping relationship.

Journaled at each end of the lower section A in suitable bearings 15 supported on standards 16 are pairs of sprocket wheels 18 and 19. The two sprockets at each end are transversely spaced on a common shaft, and mounted on each of the longitudinally aligned pairs of sprockets is an endless chain 20. With this arrangement, a pair of transversely spaced endless chains are movable around end sprockets and have upper and lower run or reach portions disposed longitudinally of the machine. Each of the chains 20 is equipped with a plurality of rollers 21, Figure 3, at spaced intervals throughout the length thereof to engage between the teeth of the sprocket wheels. Longitudinal frame members 11 comprise angle beams having flat top surfaces carrying roller tracks 11b tangential to the pitch circles at the top and bottom of the sprocket wheels. The rollers 21 engage the upper tracks 11b in the upper runs of the chains and other rollers 22, presently to be described, engage the lower tracks in the lower runs of the chains to support the chains intermediate the sprockets.

Figure 3:
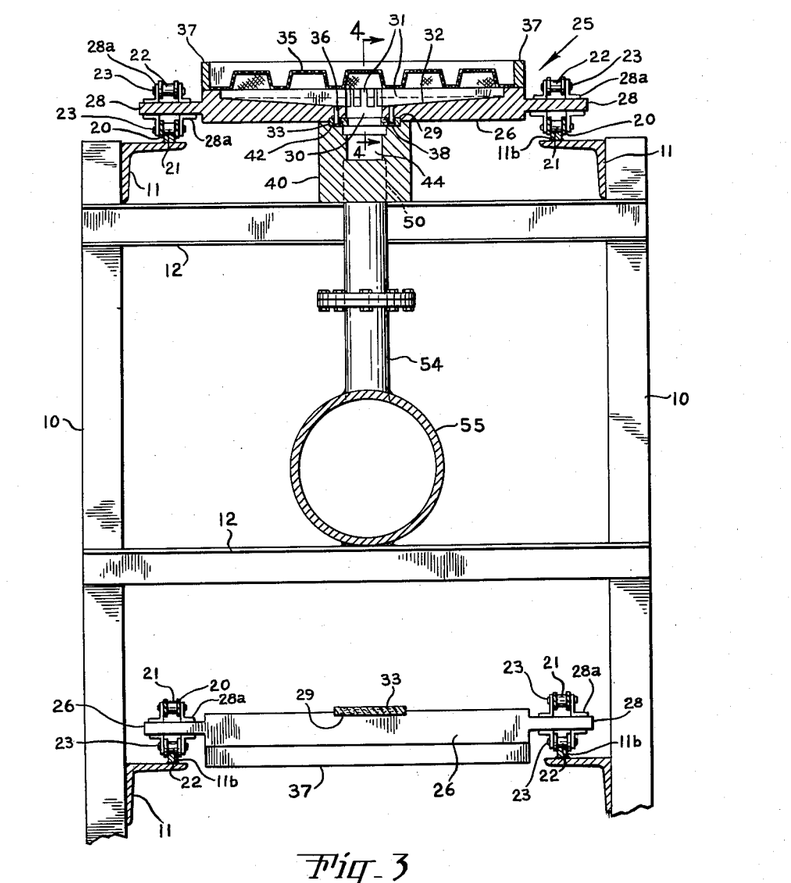
Figure 3 is a cross sectional view taken on the line 3—3 of Figure 1 and showing in particular the structure of a forming die holder, the carrier mechanism therefor, and the vacuum bar associated therewith.
Figure 4:
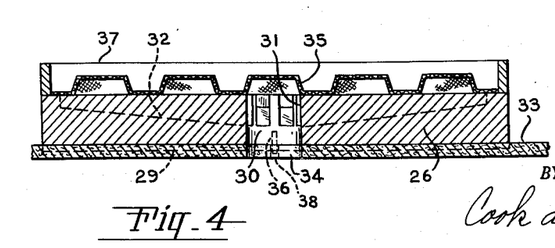
Figure 4 is a longitudinal sectional view of the forming die holder taken on the line 4—4 of Figure 3.

Securely attached to each of the two parallel chains 20 in transverse relationship is a plurality of rectangular forming die holders 25 each comprising a head portion 26 having side tongues 28, Figure 3, secured to the chains 20 by brackets 28a connected with pins 23 in the chains. A single connection is thus made with each chain on one side of a tongue 28 midway between the leading and trailing ends of the die holder so that the die holders will pass freely around the sprocket wheels. On the other side of tongues 28, at the four corners of the die holder, are similar brackets 28a carrying the previously mentioned rollers 22. Tracks 11b extend between the bracket flanges and chain side links to keep the rollers on the tracks.

Each of the head portions 26 has a bottom groove 29 extending the full length of the head, a vertical central port 30, and an enlarged upwardly facing recess 32 which is in communication with the port 30 and which is covered by a forming mold or die member 35. Recess 32 has a plurality of ribs 31 therein for reinforcing the head structure. Die 35 assumes the contour of the bottom surface of the desired end product and is fabricated from a suitable material having the necessary rigidity and being perforated to permit water to be drawn therethrough from pulp material which has been deposited on the mold member. The die holders 25 are movable with the chains 20 around the end sprockets 18 and 19 in a continuous molding operation.

Figure 6:
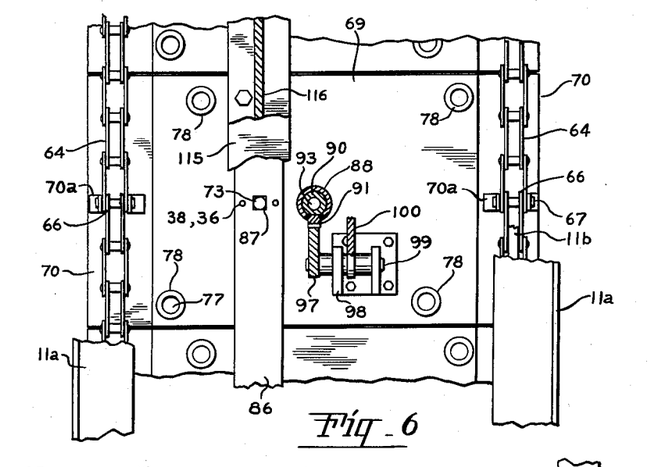
Figure 6 is a sectional view taken on the line 6—6 of Figure 5.
Figure 7:
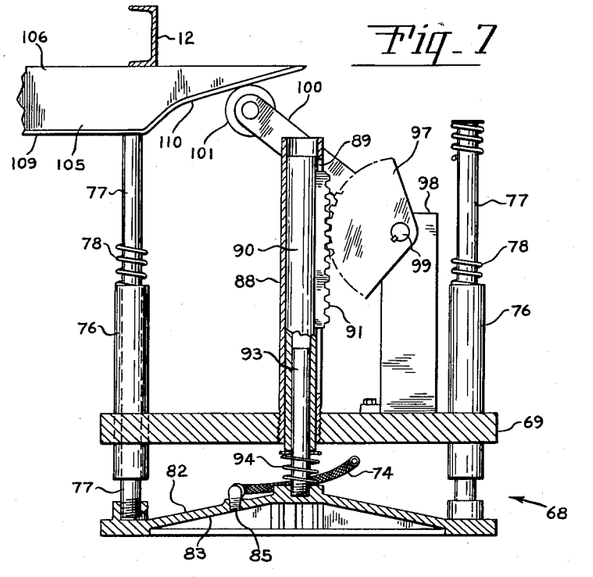
Figure 7 is a sectional view taken on the line 7—7 of Figure 5.

Groove 29 receives a sealing member 33 in the form of an endless belt which moves with the die holders and their carrier chains. Belt 33 is provided with a plurality of apertures 34 in predetermined spaced relation and in communication with ports 30 in the die holders, Figures 3 and 4. To maintain registry of apertures 34 with ports 30 the die holders are equipped with pins 36 engaging holes 38 in the belt on opposite sides of each aperture 34 the same as shown in Figure 6. The belt is supported around the sprocket wheel shafts on rolls (not shown) having the same diameter as the pitch diameter of the sprocket wheels. Each of head portions 26 is provided with an upstanding rim 37 which projects slightly above the upper surface of the die 35, and this rim is adapted to have a sliding, sealing fit with the bottom surface of wall 14.

Figures 8, 9:
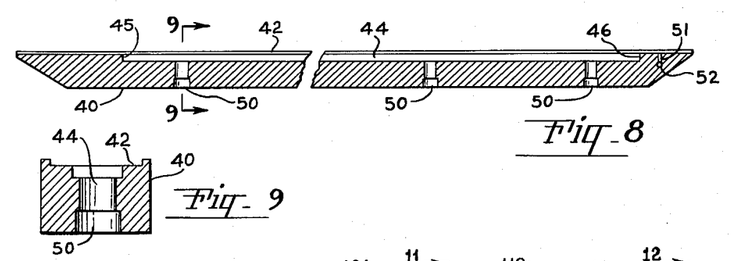
Figure 8 is a longitudinal sectional view of the vacuum bar associated with the forming dies.
Figure 9 is a cross sectional view taken on the line 9—9 of Figure 8.
Figures 10, 11, 12:
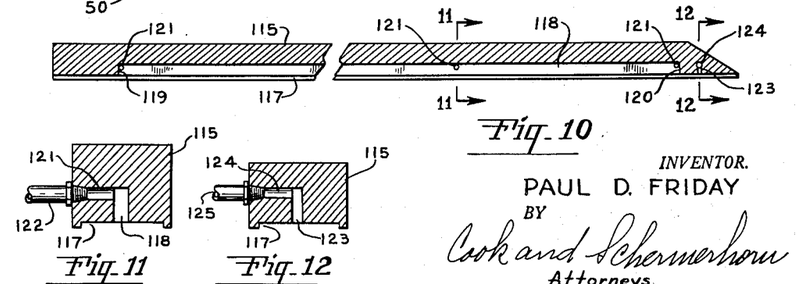
Figure 10 is a longitudinal sectional view of the vacuum bar associated with the transfer die assemblies.
Figure 11 is a cross sectional view taken on the line 11—11 of Figure 10.
Figure 12 is a cross sectional view taken on the line 12—12 of Figure 10.
Figure 13:
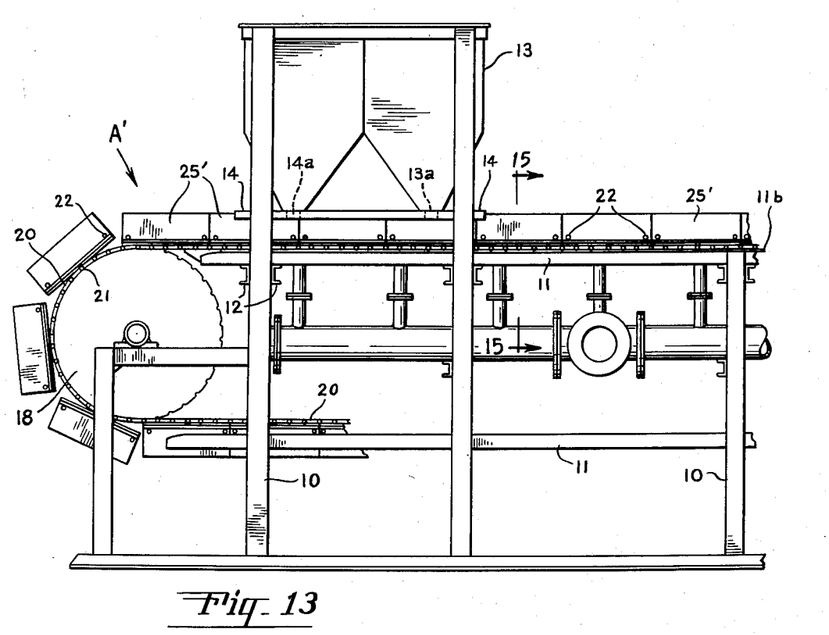
Figure 13 is a side elevational view of a portion of a second embodiment of the present invention.

Fixedly mounted on transverse frame members 12 is a longitudinally disposed vacuum bar 40, shown in detail in Figures 3, 8 and 9, having a top groove 42 extending the full length thereof. Groove 42 receives the seal 33 and is of a dimension to permit free slidably movement of the seal therein. Bar 40 is provided with a second longitudinal groove 44 having left and right end walls 45 and 46, respectively, spaced from the ends of the bar, and having spaced inlet orifices 50 communicating with the longitudinal groove 44. Bar 40 is provided at its right-hand end, beyond the end wall 46 of groove 44, with an orifice 51 communicating with groove 42 and a port 52 connected to suitable conduit means through which is supplied a pressured air stream. The purpose of the pressured air stream in the orifice 51 is to relieve the vacuum and blow off the pulp article from the forming dies at a transfer station. Orifices 50 have sealed connections with upright suction inlet conduits 54 communicating with a longitudinal vacuum chamber 55 connected to a suitable source of vacuum.

When the machine is in operation, suction from vacuum chamber 55 is established in the longitudinal groove 44 of the bar 40 by means of conduits 54 and orifices 50, and a vacuum condition is thereby created in the recesses 32 of the heads 26 through the openings 30. The vacuum condition in the heads is created when the holders move to the right beyond the left end 45 of groove 44 and is terminated when the holders pass beyond the right end 46 of groove 44 as seen in Figure 8. Such vacuum condition is created simultaneously with the movement of the holders under the first discharge opening 13a of the vats 13, and, as the holders move along the bar 40, the pulp which has been deposited on the dies 35 is subjected to a dehydration step for removing excess liquid in the pulp. When moving under the vats 13, the rim 37 of the die holders slidably engages the bottom of wall 14 and confines the pulp to the die as the die moves across the opening 14a. As the die holders are disposed substantially in abutting relationship, there will be almost a continuous flow of furnish through desired openings 13a when the machine is in operation.

With the straight line movement of the forming die holders and the sequential tank arrangement shown, it is possible to deposit more than one grade of pulp into the same die to produce a laminated product. In the formation of some articles it may be desirable to form the body portion thereof from an inexpensive furnish and a surface or surfaces from a higher quality material. To accomplish this function, the furnish from each of the tanks 13 may be deposited in the forming dies in a predetermined amount and in a proper sequence so that the inexpensive furnish forms the body of the article and the higher quality furnish provides merely a surface layer. More than two tanks may be used to form an article having a greater number of laminations.

Mounted under the section A of the machine are nozzles 56 for ejecting a spray against the outer surface of the forming dies, and performing a cleaning operation thereon. Nozzles 56 can be disposed at any desired location under return run.

Figure 5:
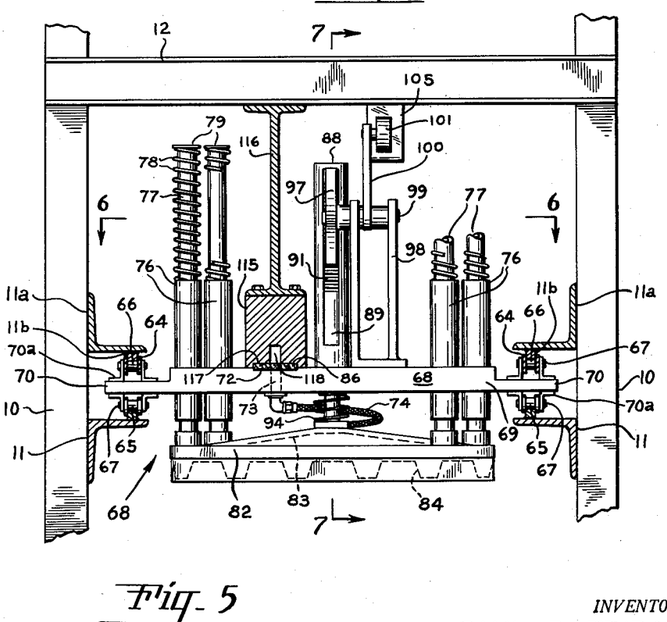
Figure 5 is a cross sectional view, taken on the line 5—5 of Figure 2, and showing in particular the structure of a transfer die holder, together with the carrier mechanism and vacuum bar associated therewith.

Referring to Figure 2, the upper section B of the machine comprises pairs of end sprockets 60 and 61 on a shaft journaled in suitable bearings 62 supported on the machine framework. Carried on the sprockets is a pair of parallel chains 64 similar to the chains 20 and having rollers 66, Figure 5. The chains have upper and lower run or reach portions disposed longitudinally of the machine, and the chains in each of these run portions are supported on respective upper and lower longitudinal frame members 11 by means of the rollers 66 and 65. As seen in Figure 5, an additional frame member 11a with a track 11b is disposed above the frame members 11 on each side adjacent the lower run of the chains, and thereby in this particular run both rollers 65 and 66 engage a frame or track member whereby the chains are confined vertically therebetween.

The drive mechanism for the machine is not shown and may comprise conventional power means. Importantly, the sprocket wheels in both the lower and upper sections of the machine are connected together and driven at the same speed so that the lower and upper chain carriers for the dies also move at the same speed.

Secured to the two chains 64 in transverse relationship by pins 67 on the chains is a plurality of compression or transfer die holders 68, these holders each having a plate portion 69 with side tongues 70, Figure 5, secured on one side to the chains 64 by central brackets 70a on the pins 67. On the opposite side of tongues 70 are additional brackets 70a, carrying the rollers 65 at the four corners of the die holders the same as rollers 22 in Figure 3.

Plate portion 69 has a longitudinal top groove 72 and has a bore 73 extending vertically from its bottom surface into communication with the groove 72. Bore 73 is connected to a flexible conduit 74. Securely mounted in the plate portion 69 are upright guide sleeves 76 having stems 77 slidable therein. Each of the stems 77 is biased upwardly by a spring 78 carried thereon having its ends engageable between the sleeve 76 and an abutment washer 79 on the upper end of the stem. Secured to the bottom ends of the stems 77 is a transfer die head 82 having a downwardly facing recess 83 and a transfer mold or die member 84, Figure 5. The conduit 74 is connected to the head 82 by a connection 85, Figure 7, which opens into the recess 83 and establishes communication between said recess and the bore 73. Groove 72 extends from the leading to the trailing edge of the plate 69, and receives a belt seal 86 having spaced apertures 87 in communication with bores 73. Seal 86 is continuous and is supported around the sprocket wheel shafts on rolls having the same diameter as the pitch diameter of the sprocket wheels 60 and 61. In order to maintain registry of belt apertures 87 with bores 73 each plate 69 is equipped with pins 36 to engage in holes 38 in the belt on opposite sides of each aperture 87 as shown in Figure 6.

Mounted in the plate portion 69 is another sleeve 88. This sleeve is mounted in the center of the plate portion and has a longitudinal slot 89. Slidable in the sleeve 88 is another sleeve 90 provided with a rack portion 91 projecting through the slot 89. Slidable in the sleeve 90 is a stem 93 threadedly secured to the head 82. A spring 94 is carried on the stem 93 between the head 82 and the sleeve 90 to relieve clearance contact with transfer and forming dies, and cushion the die contact on the pulp.

The head 82 is movable vertically by a segmental pinion 97 engageable with the rack 91 and pivotally mounted on an upright standard 98 by means of a pivot pin 99. Pinion 97 has integral movement with an arm 100 provided with a cam roller 101 on its free end. Roller 101 is engageable with a fixed cam plate 105 forming the bottom surface of a support member 106 secured in a predetermined position on the machine framework parts. The cam plate 105 has a rounded front portion 108, Figure 2, a substantially flat central portion 109, and an upwardly tapered rear portion 110. When the machine is in operation and the transfer die holders are carried longitudinally of the machine along the lower run of chains 64, the head 82 is moved downwardly upon engagement of the roller 101 with the cam plate 105, and the vertical position of the holder relative to the plate portion 69 is dependent upon the position of the holder in relation to the cam plate 105.

A longitudinal bar 115 is attached to the machine framework by a longitudinal I-beam 116, Figure 5, and this bar 115 has a longitudinal bottom groove 117 arranged to receive the belt seal 86 in a slidable sealing fit. Bar 115 is provided with a second longitudinal groove 118 having left and right end walls 119 and 120, respectively, Figure 10, spaced from the ends thereof, and this groove communicates with a plurality of transverse ports 121 connected to conduits 122 leading from a suitable source of vacuum. After each die holder travels around end sprockets 60, it moves with the chains into the lower run thereof and the seal 86 moves into engagement with the groove 117 of bar 115 whereby vacuum is thereby established in the recess 83 through one of the apertures 87, port 73, conduit 74, and connection 85.

Bar 115 is provided at its right-hand end, beyond the groove 118, with a bottom opening orifice 123 communicating with a port 124 connected to a conduit 125 through which is supplied a pressured air stream from a suitable source. This pressured air supply is for blowing off the formed articles from the transfer dies.

A conveyor belt 126, Figure 2, is disposed below and at the right-hand end of the upper section B of the machine for receiving the articles from the transfer dies and for carrying said articles into suitable drying mechanism, the belt 126 being supported on suitable rollers 127. Importantly, the belt 126 moves at the same rate of speed as the carrier for the transfer dies, whereby no distortion from sliding of the wet articles will result when the articles are deposited thereon.

*Operation of embodiment in Figures 1–12*

In the operation of the machine, the forming die holders 25 move with the chains 20 around the sprockets 18 and 19 and ride along the frame members 11 on the rollers 21. Upon moving over the top of the sprockets 18 in the upper run of the chains 20, the seal 33 engages groove 42 in the bar 40. The holders are thereafter guided in a straight line along said run of the chains and, in addition, the holders receive vertical support intermediate the rollers by reason of their engagement with the rigid bar 40. The forming die holders move under the vats 13 and the desired furnish is deposited on the dies 35, the rim 37 being in engagement with the bottom wall 14 of the vat to confine the pulp in the mold. Simultaneous with movement under the first vat 13, the openings 30 in the heads 26 and the apertures 34 in the seal 33 move to the right of end wall 45 at the left end of the groove 44 and establish communication with said groove so that the recess 32 of the head 26 is subjected to suction. Thereupon, when the furnish is deposited on a die surface, a certain amount of the water therein is drawn into the vacuum system and carried away by the manifold pipe chamber 55 as the dies move along the upper run of the chains. The vacuum for the forming dies is aided by gravity created by the water falling downwardly into the vacuum chamber 55.

The upper surface of the pulp mixture is exposed to atmospheric pressure as the forming die holders move along the upper run of chains 20. As best seen in Figure 2, as these holders approach the right-hand end of the run, transfer die holders 68 move around the sprocket 60 into vertical alignment therewith. As these holders then move further to the right, the seal 86 moves into engagement with the groove 117 on the bottom surface of bar 115. Upon further movement, the cam rollers 101 on the transfer die holders engage the rounded surface 108 of cam plate 105 and cause the heads 82 to be lowered, by reason of the rotation of pinion 97, whereby the transfer dies 84 move into firm contact with the pulp in forming dies 35, calendering the rough upper surface of the pulp by the pressure exerted by spring 94 for an interval of time. When the transfer dies are urged into contact with the forming dies, an upward force is exerted on the plate portion 69, and the plate is supported against upward movement by the bar 115 and the frame members 11a, the frame members 11a also serving to maintain the plate portion 69 in a horizontal position. While the transfer dies are in contact with the forming dies, the ports 30 in heads 26 pass beyond the right-hand end 46 of groove 44 and the forming die holders are thus released from the vacuum system of the lower section A of the machine. Prior to the closing of the two die portions, sufficient moisture has been drawn from the pulp which has been deposited on the forming dies so that a paper mat is formed between the dies and so that said mat in the form of the final product can be transferred to the transfer die.

The transfer and forming dies are held in firm contact for calendering purposes throughout the time that roller 101 is engaged with surface 109 of cam plate 105, and, while the roller is traveling along this surface and immediately subsequent to the release of vacuum in the forming dies, the bore 73 in plate 69 moves over end wall 119 of the groove 118 in the bar 115 whereby the upper head 82 is subjected to vacuum. The cam roller 101 then moves off the cam surface 109 and engages the tapered surface 110 to permit the head portion of the transfer die holders to be moved upwardly by the action of springs 78 on the stems 77. Approximately simultaneous with the starting up of the transfer die holder, the forming die holder has assumed a position such that the port 30 therein and the aperture 34 in the seal 33 are in communication with the orifice 51. Pressured air can thus flow into the recess 32 of head 26 and positively release the formed article from the forming die. The forming die holders 25 pass around the end of sprockets 19 and move along the lower run of the chains to their original starting position, the rollers 22 of the chains 20 engaging lower frame members 11 in this return or bottom run, Figure 3. On this return run the forming dies 35 face downward and pass through the pressured water spray from nozzles 56, thereby cleaning any pulp residue from their surface each cycle.

When the two die holders are separated, the mat product is held in engagement with the upper die 84 by the vacuum in head 82, but when the die assembly has moved sufficiently to the right to pass beyond the end of groove 118, the vacuum is broken in the upper head. Upon further movement of the die assemblies, the bore 73 comes into communication with the orifice 123, and the head 82 is thereby subjected to air pressure whereby the formed product is blown off the transfer mold and deposited on the conveyor belt 126. Conveyor belt 126 moves through a drying chamber, not shown, for effecting a final dehydration step.

To accomplish the formation of these products, it is imperative that the chains 20 and 64 move at the same speed and that the upper and lower die holders have the same dimensions so that, as the forming die travels to the right through the machine, a transfer die will be disposed over said forming die and be adapted to register therewith when caused to descend by reason of the cam roller 101 engaging the cam plate 105.

*Embodiment in Figures 13–19*

Referring now to Figures 13–19, there is shown a second embodiment of the machine, and, similar to the first embodiment, this machine comprises a lower section A' and an upper section B' disposed in partially overlapping relation. The framework for the machine comprises a plurality of upright frame members 10, longitudinal frame members 11, and transverse frame members 12. Vats 13 having discharge openings 13a are mounted on frame members 10 and a horizontal wall 14 at the bottom of the vats has orifices 14a in communication with the openings 13a.

The lower section A' has pairs of end sprockets 18 and 19 for carrying a pair of parallel endless chains 20 supported on rollers 21 and 22 engageable with tracks 11b on upper and lower longitudinal frame members 11 to form upper and lower longitudinal run portions in which the chain is supported by said frame members. Also similar to the first embodiment, the chains 20 have a plurality of rectangular female or forming die holders 25' attached thereto, each comprising a head portion 26 having side tongues 28. Rollers 21 are in the chains which are connected at central points on one side of tongues 28 while rollers 22 are mounted on the opposite side of the tongues at the four corners of the die holders.

Each die holder has a bottom bore 135 for receiving a resilient sealing member 136 having an annular body portion 137, which fits snugly in the bore 135, and an angularly projecting flexible lip or flange portion 138. The die holder head portion 26 has a central port 30 and an enlarged upwardly facing recess 32 in which is contained the female forming die, not shown.

In this embodiment the sealing members 136 are in engagement with a belt 33 having a plurality of apertures 34 in predetermined spaced relation so as to be centrally aligned with the sealing members 136. The belt moves on end rolls, not shown, at the same rates of speed as the die holders and their carrier chains.

Figure 15:
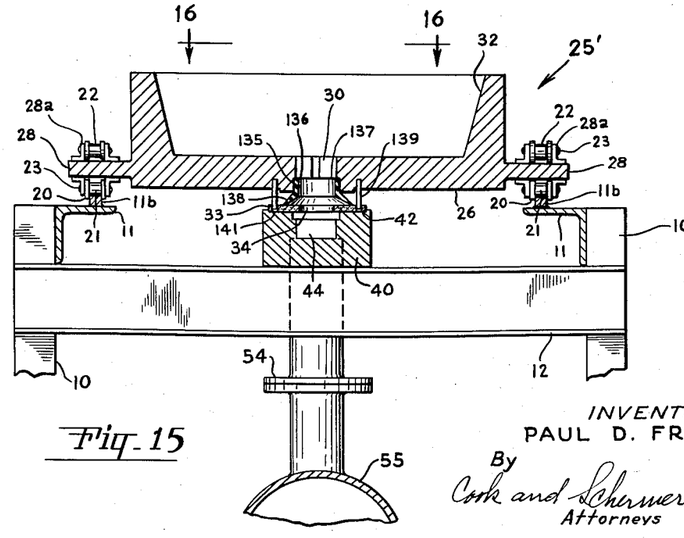
Figure 15 is a cross sectional view taken on the line 15—15 of Figure 13.
Figure 16:
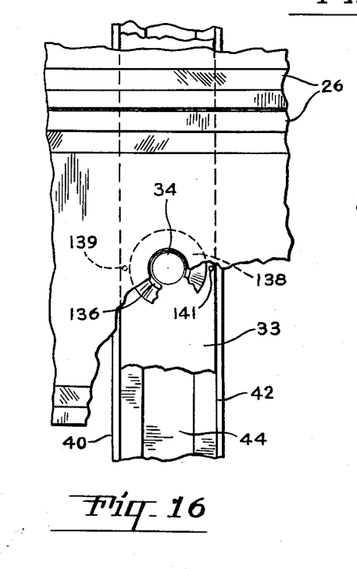
Figure 16 is a fragmentary top plan view with parts broken away, taken on the line 16—16 of Figure 15.

Fixedly mounted on transverse frame members 12 is a longitudinal vacuum bar 40 having a top groove 42 extending the full length thereof and receiving the belt 33 in a sliding fit. The structure of this vacuum bar is shown in detail in Figures 8 and 9 of the first embodiment and this bar has a second longitudinal groove 44 constituting a vacuum chamber and also has inlet connections with upright suction conduits 54 communicating with a longitudinal vacuum chamber 55. In the operation of the machine the belt 33 moves around the end rollers and has sliding engagement in its upper run with the groove 42 of the bar 40. The sealing members 136 engage the belt along the upper run of the chains, as shown in Figure 15, and when a vacuum exists in the groove 44 a positive seal is established between the members 135 and the belt 33. In this second embodiment the die holders are supported entirely by the tracks 11b and do not bear against the vacuum bar 40.

Figure 14:
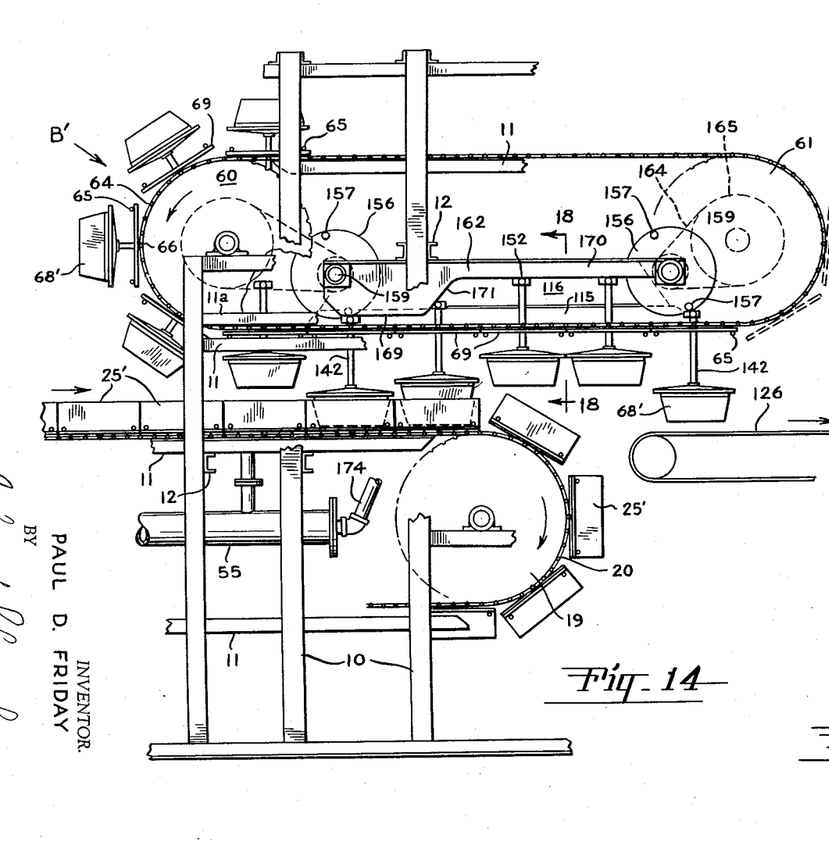
Figure 14 is a side elevational view of the remaining portion of said second embodiment.
Figure 18:
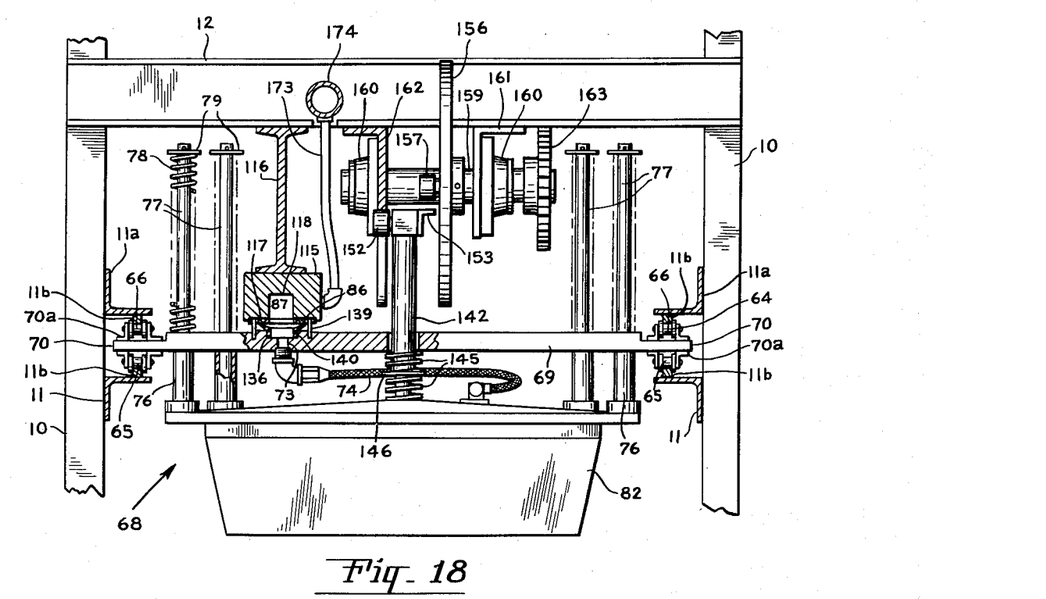
Figure 18 is a cross sectional view taken on the line 18—18 of Figure 14.
Figure 19:
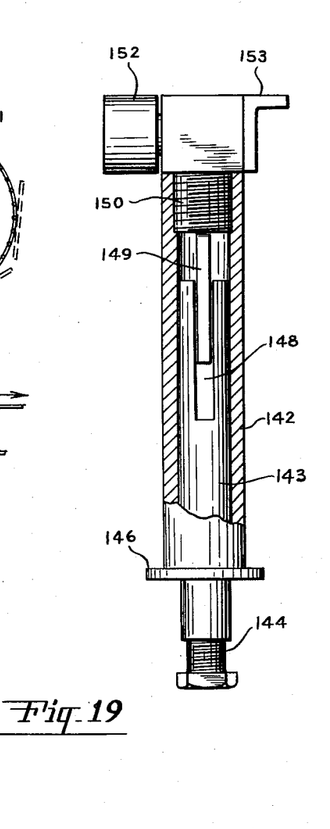
Figure 19 is an elevational view with parts broken away of a transfer die holder mounting sleeve comprising a part of said second embodiment.

Referring to Figure 14, the upper section B' has pairs of end sprockets 60 and 61 on which is carried a pair of parallel chains 64 having upper and lower run or reach portions disposed longitudinally of the machine, these run portions being supported on tracks 11b on upper and lower longitudinal frame members 11 by means of rollers 65 and 66, Figure 18. Additional frame members 11a also having tracks 11b are disposed above the frame member 11 on each side along the upper run to confine the chains in a vertical direction.

A plurality of male or transfer die holders 68' are attached to the chains, as best seen in Figure 18, and each comprises a plate portion 69 with side tongues 70 secured to the chains. Rollers 66 are in the chains which are attached to central brackets 70a on one side of the tongues while rollers 65 are mounted on brackets 70a on the opposite side of the tongues at the four corners of plate 69.

Figure 17:
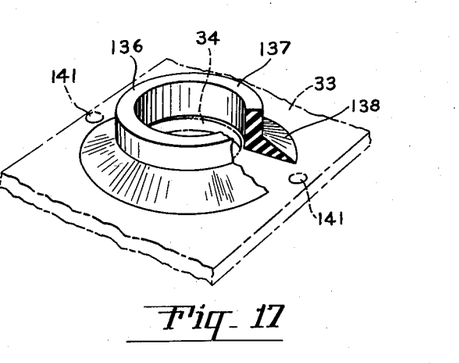
Figure 17 is a fragmentary perspective view with parts broken away, showing in particular vacuum sealing means which are disposed between the transfer die holders and the longitudinal vacuum bar of said second embodiment.

Plate 69 has a bore 140 for receiving in a snug fit a sealing member 136 of the same structure described in connection with the forming dies and illustrated in Figure 17, this sealing member having a sealing connection with a belt 86 and being aligned with apertures 87 in said belt. Mounted integrally in the plate portion 69 are upright guide sleeves 76 having stems 77 slidable therein. These stems are biased upwardly by springs 78 and are connected at their bottom end to a transfer die head 82. Plate 69 has a bore 73 communicating at the upper end thereof with the interior of the sealing member 136 and having a flexible conduit 74 connected to the lower end thereof.

In this embodiment the lower belt apertures 34 are maintained in registry with ports 30 in the forming die holders, and upper belt apertures 87 are maintained in registry with bores 73 in plates 69 by means of belt holes 141 on opposite sides of each suction aperture engaged by pins 139 on die holder 26 and plate 69 as shown in Figures 15 to 18. Thus, the belts 33 and 86 cannot creep relative to the die holders.

Mounted in the plate 69 is a central sleeve or post 142, and slidable in this post is a stem 143 projecting from the bottom thereof. The stem 143 slidably projects through an opening in the top of head 82 and a screw 144 threaded in the bottom of the stem provides supporting relation between said stem and the head 82. This post is shown in detail in Figure 19, and has a resilient or shock absorbing connection with the head 82 by means of a pair of springs 145 disposed on opposite sides of an abutment washer 146, one of the springs engaging the plate 69 and the other spring engaging the head 82. Stem 143 has a rectangular slot 148 on its upper end for receiving a rectangular finger member 149 projecting downwardly from a threaded shank 150 threadedly mounted in the post 142 to prevent rotation of the post.

Journaled at the upper end of the post 142 on one side thereof is a cam follower roller 152 and integrally attached to the opposite side of the post is a flanged cam follower plate 153. The head 82 is adapted to be moved downwardly against the action of springs 78 by means of a pair of cam discs 156 disposed at opposite ends of a cam plate 162. These discs have a pair of rollers 157 journaled on one face thereof, and, as best seen in Figure 18, the parts are arranged such that the cam discs 156 are slightly offset from the line of travel of the cam follower plate 153 on the post 142 and the rollers 157 engage the upper surface of said cam follower plates 153 for forcing the post 142 downwardly. The discs 156 are mounted on shafts 159 journaled in bearings 160 supported at one end by brackets 161 secured to transverse frame members 12 and supported at their other end in a cam plate 162 also secured to frame members 12. Each shaft 159 has a sprocket 163 keyed thereon engageable by a chain 164 in turn engageable with a sprocket 165 mounted on the same shafts as the sprockets 60 and 61.

The drive ratio of the cam disc 156 is such that as the transfer dies move around the left-hand sprocket 60 and into vertical alignment with a forming die, a roller 157 on the left-hand disc 156, Figure 14, will engage the cam follower plate 153 on the post 142 and move the transfer die downwardly into engagement with a forming die. The cam plate 162 has a lower front cam portion 169, an upper rear cam portion 170 and an intermediate inclined cam portion 171. In the travel of the transfer dies from one end of cam plate 162 to the other, the rollers on the cam disc 156 first lower the post 142 into a plane with the cam surfaces 169 and thereupon the roller 152 rides across this latter surface, up the surface 171, and across the surface 170, and, upon nearing the end of the surface 170, a roller 157 on the rear disc 156 engages the cam follower plate 153 and lowers the head 82 to a level closely adjacent the top surface of conveyor 126 so that the damp and fragile article is deposited gently on said conveyor at synchronous speed without impact, scuffing or sliding. After deposit of the article in conveyor 126, head 82 is raised vertically by roller 157 to clear the deposited article before the transfer die assembly starts to tilt in passing around end sprockets 61.

The belt 86 along the lower run thereof engages a bottom groove 117 in a longitudinal bar 115 supported in a horizontal position by an I-beam 116 on a transverse frame member 12. The bar 115 has a second groove or channel 118 and has the same structure as that shown in Figures 10, 11 and 12, having an orifice 123 at its right-hand end connected to an air pressure supply for blowing off the formed articles from the transfer dies at the time these dies are lowered adjacent the conveyor 126. Groove 118 in the bar 115 is in communication with a pipe 173 connected to another vacuum pipe 174 in turn connected to the vacuum chamber 55 in the lower section of the machine.

Similar to the operation described in connection with the first embodiment, the transfer dies 68' are in engagement with the forming dies when the vacuum from the forming dies is released and, thereupon, vacuum is introduced to the transfer dies. During the interval of engagement, springs 145 press the forming dies firmly against the top surface of the pulp in the forming dies to perform a calendering function so that both top and bottom surfaces of the finished article will be smooth. The molded articles are transferred to the transfer dies by the vacuum in said latter dies and also by compressed air introduced to the forming dies. The article is maintained on the transfer die until the sealing member 136 passes beyond the end of groove 118 and comes into communication with the pressure orifice 123.

Flexible lips 138 hold their sealing engagement with the upper and lower belts 86 and 33 notwithstanding possible slight vertical movement of plates 69 and die holders 25 during their travel on roller tracks 11b. A seal is thereby maintained during the suction phase of the molding cycle without extreme precision in the adjustment of the tracks and vacuum bars 115 and 40.

The straight line movement in the present machine has numerous important advantages over conventional rotary machines. It permits the use of more than one supply tank for making laminated articles. It provides travel of the female or forming die holders in horizontal position during the deposit of pulp and throughout the forming period so that pulp does not run over one side and form a ragged edge on the molded article which must later be removed. It provides a dwell period for the transfer die to be pressed firmly into the forming die for calendering purposes whereby both sides of the finished article will be smooth. Further, it facilitates deposit of the damp and fragile molded article in precise position on a drying tunnel conveyor belt without dropping, scuffing or distorting the article. Still other advantages result from the simplicity of the mechanism, the absence of valves and other feaures referred to in the objects of the invention.

Having now described my invention and in what manner the same may be used, what I claim as new and desire to protect by Letters Patent is:

1. A machine for forming articles from pulp comprising an endless chain of forming die holders having a straight and level upper run, means for depositing pulp in dies in said holders at the beginning of said run, a stationary suction trough extending along said run and underlying said holders in said run to apply suction to the holders, an endless chain of transfer die holders having a straight and level lower run above said upper run of forming die holders and in parallel relation thereto, a stationary inverted suction trough extending along said run of transfer die holders and overlying said holders to apply suction to the holders, and means for depressing said transfer die holders relative to the level of their run toward and into cooperative engagement with said forming die holders at a predetermined point in said runs.

2. A machine for forming pulp articles comprising a first elongated framework, a pair of transversely spaced elongated endless carriers mounted on the framework and movable longitudinally of said framework, rollers on said carriers, longitudinal support members engageable by said rollers for supporting the carriers, a plurality of holders containing forming dies carried between said carriers for movement therewith, a second elongated framework disposed above and in overlapping relation with one end of said first framework, a pair of transversely spaced elongated endless carriers movable longitudinally of said second framework, rollers on said last mentioned carriers, longitudinal support members engageable by said rollers for supporting said last mentioned carriers, a plurality of holders containing transfer dies carried between said last mentioned carriers for movement therewith and being arranged in their movement to cause said transfer dies to engage said forming dies, longitudinal vacuum chambers communicating with said transfer and forming die holders as said holders move along with said carriers, and means for applying vacuum to said die holders in sequence for first forming a pulp article in a forming die and subsequently transferring the formed article to a transfer die.

3. A machine for forming pulp articles comprising a first elongated framework, a pair of continuous parallel chains mounted on the framework and movable longitudinally of said framework and having upper and lower reaches, rollers on said chains, longitudinal support members engageable by said rollers for supporting the chains in their upper and lower reaches, forming die holders, containing forming dies, attached to said chains for movement therewith, a longitudinal vacuum chamber communicating with said forming die holders for subjecting said holders to suction as said holders move along with the upper reaches of the chains, a second elongated framework disposed above and in overlapping relation with one end of said first framework, a pair of continuous parallel chains movable longitudinally of said framework and having upper and lower reaches, rollers on said last mentioned chains, longitudinal support members engageable by said rollers for supporting said last mentioned chains in their upper and lower reaches, transfer die holders, containing transfer dies, attached to said last mentioned chains for movement therewith and being arranged in their movement on the lower reach of said chains to cause said transfer dies to engage said forming dies in said holders on the upper reach of said first mentioned chains, a longitudinal vacuum chamber communicating with said transfer die holders as said holders move along with the lower reach of said chains, and means for applying vacuum to said die holders in sequence for first forming a pulp article in a forming die and subsequently transferring the formed article to a transfer die.

4. A machine for forming pulp articles comprising a first elongated framework having upper and lower longitudinal frame members, a pair of sprockets mounted on the framework adjacent each end of said framework, a pair of endless parallel chains on said sprockets disposed longitudinally of said framework and being movable over said sprockets in longitudinal reaches along the upper and lower portions of said framework, rollers on said chains, the upper and lower reaches of said chains being supported by said rollers on the respective upper and lower longitudinal frame members, forming die holders attached to said chains for movement therewith, forming dies on said holders, a longitudinal vacuum chamber communicating with said forming die holders for subjecting said dies to suction as said holders move along with the upper reaches of the chains, a second elongated framework disposed above and in overlapping relation with one end of said first framework, a pair of sprockets adjacent each end of said second framework, a pair of continuous parallel chains on said sprockets disposed longitudinally of said second framework and being movable over said sprockets in longitudinal reaches along the upper and lower portions of said second framework, rollers on said last mentioned chains, the upper and lower reaches of said last mentioned chains being supported by said rollers on the respective upper and lower longitudinal frame members of said second framework, transfer die holders attached to said last mentioned chains for movement therewith, transfer dies on said last mentioned holders, said last mentioned holders being arranged in their movement on the lower reach of said chains to cause said transfer dies to engage said forming dies on the upper reach of said first mentioned chains, a longitudinal vacuum chamber communicating with said transfer die holders as said holders move along with the lower reach of said chains, and means for applying vacuum to said die holders in sequence for first forming a pulp article in a forming die and subsequently transferring the formed article to a transfer die.

5. A machine for forming articles from pulp comprising a horizontal elongated open top lower vacuum chamber, a straight and level track carrying a set of lower die holders connected to endless chains for movement along the top of said lower chamber in sliding communication therewith to subject said holders to suction, a horizontal open bottom upper vacuum chamber vertically spaced above said lower chamber, a straight and level track carrying a set of upper die holders connected to endless chains for movement along the bottom of said upper chamber in sliding communication therewith above said lower die holders, means for depressing portions of said upper die holders relative to their track into engagement with portions of said lower die holders as said lower die holders approach the end of said lower vacuum chamber, means for raising said upper die holders relative to their track at a point beyond said end of said lower vacuum chamber, and a compressed air chamber communicating with said upper die holders beyond the end of said upper vacuum chamber.

6. A pulp molding machine comprising a pair of parallel level tracks, an elongated open top vacuum chamber extending longitudinally between said tracks, a series of lower die holders connected together by endless chains for travel on said tracks in communication with said open top of said vacuum chamber, a pulp vat mounted above said tracks and having a bottom discharge opening in slidable sealing engagement with said die holders, a pair of upper parallel level tracks above and extending beyond said first tracks, an elongated open bottom upper vacuum chamber extending longitudinally between said upper tracks, a series of upper die holders connected together by endless chains for travel on said upper tracks in communication with said open bottom of said upper vacuum chamber, means for depressing forming portions from said upper die holders relative to their tracks into temporary engagement with forming portions of said lower holders, and a pressure chamber communicating with said upper die holders at a position beyond the limit of travel of said lower die holders.

7. In a machine for forming articles from pulp, a stationary cam plate having a cam surface, carrier means movable in a run adjacent said cam plate, a supporting plate secured to said carrier means, a die head slidably mounted for vertical movement in said supporting plate, a cam follower on said die head arranged to follow said cam plate, and rotary cam means arranged to move said cam follower into engagement with said cam plate.

8. In a machine for forming articles from pulp, a stationary cam plate having a cam surface, carrier means having a straight run adjacent said cam plate, an elongated member disposed longitudinally adjacent said run, a vacuum supply groove in said member, a supporting plate secured to said carrier means having orifice means arranged to communicate with said vacuum supply groove as said plate travels along said run with said carrier means, a die head slidably mounted for vertical movement in said supporting plate, said die head having a vacuum chamber therein, conduit means for establishing communication between said orifice means and said vacuum chamber in said die head, and cam follower means on said die head arranged to move along said cam surface upon movement of said carrier means along said run for producing relative slidable movement between said plate and said head.

9. In a machine for forming laminated pulp articles, a traveling carrier having a plurality of die holders in edge abutting relation, a plurality of pulp supply tanks disposed above said carrier, a flat plate on the bottom of said tanks overlying said die holders in sliding sealing engagement therewith, and discharge openings for said tanks in said plate spaced along the run of said carrier for sequentially depositing layers of pulp from said tanks in die members moving along said run, and vacuum means communicating with the die holders for forming pulp layers on dies contained in the die holders.

10. In a machine for forming articles from pulp and including a traveling carrier having an elongated straight run portion, a plurality of apertured die holders attached to said carrier, and an elongated suction trough extending along said run: a belt traveling with said carrier in spaced relation to said die holders covering the open side of said trough, said belt having an opening at each die holder, and flexible annular sealing means on each die holder interconnecting said die holder apertures and belt openings to communicate trough suction to said die holders.

11. In a pulp molding machine having a suction trough and a chain of apertured die holders traveling in communication with said trough: a belt seal on said trough traveling with said die holders in spaced relation thereto, said belt having openings in register with the apertures in said die holders, and flexible annular seals on said die holders around the die holder apertures engaging said belt.

12. A pulp molding machine comprising an endless chain of forming die holders, a level track supporting said die holders in horizontal rectilinear travel, means for depositing pulp in said die holders, an endless chain of transfer die holders, a level track supporting said transfer die holders in parallel travel above said forming die holders, means for depressing said transfer die holders relative to said track into firm calendering engagement with pulp in said forming die holders for a calendering interval during said parallel travel, means for applying suction and air pressure to said die holders at different stations in said travel, a drying tunnel conveyor belt in line with said rectilinear travel, and means for depressing said transfer die holders relative to said track substantially to said belt for depositing molded pulp articles thereon during said travel.

13. In a pulp molding machine, a suction trough, a series of die holders each having a suction aperture, a pair of endless chains having pivotal connection with each die holder on an axis in transverse alignment with said suction aperture, an endless belt seal traveling with said die holders on said trough and having suction apertures to communicate with said die holders, pin holes in said belt on an axis in transverse alignment with each suction aperture in said belt, and pins on said die holders on said transverse axis of said pivotal connections loosely engaging said pin holes to hold said belt and die holder apertures in register with each other during travel along said trough.

14. A pulp molding machine comprising an endless chain of forming die holders arranged for travel in one direction in a straight and level flight of the chain, a pulp vat for filling said die holders at one end of said flight, a conveyor belt at the other end of said flight extending in said one direction away from said flight, an endless chain of transfer die holders arranged for travel in said one direction in a straight and level flight of the chain spaced above said other end of said flight of forming die holders and said conveyor belt, stationary suction means extending along said flights and communicating with said forming die holders and transfer die holders in said flights, means for lowering and raising said transfer die holders relative to the flight level thereof toward and into cooperative engagement with and away from said forming die holders during travel of said transfer die holders over said forming die holders, and means for applying compressed air to said transfer die holders during travel over said conveyor belt.

15. A pulp molding machine comprising an endless chain of forming die holders arranged for travel in one direction on a level track in an upper horizontal flight of the chain between a pair of end sprockets, a pulp vat for filling said die holders at one end of said upper flight, an endless chain of transfer die holders arranged for travel in said one direction on a level track in a lower horizontal flight of the chain between a pair of end sprockets, said lower flight of transfer die holders being spaced above the end of said upper flight of forming die holders opposite the pulp vat, stationary suction troughs communicating with said forming die holders and transfer die holders in said flights, and means for lowering and raising said transfer die holders relative to the track for said holders toward and into cooperative engagement with and away from said forming die holders during the travel of said transfer die holders over said forming die holders.

16. A pulp molding machine as defined in claim 15 including a conveyor belt at the end of said upper flight forming die holders opposite the pulp vat and extending in said one direction away from said upper flight and spaced below said lower flight of transfer die holders, and means for applying compressed air to said transfer die holders during their travel over said conveyor belt.

17. A pulp molding machine as defined in claim 16 including means for lowering and raising said transfer die holders relative to the track for said die holders during travel over said conveyor belt.

18. A pulp molding machine as defined in claim 15, each transfer die holder having a base member constrained to travel in a level path relative to the track for said transfer die holders in said lower flight thereof, and means for depressing each transfer die holder relative to its base member as the die holder proceeds along said track.

19. A pulp molding machine as defined in claim 15, each transfer die holder having a base member constrained to travel in a level path at uniform height relative to the track for said transfer die holders in said lower flight thereof, and cam means arranged along said track to depress said transfer die holders relative to said base members for lowering said transfer die holders relative to said track.

20. A pulp molding machine as defined in claim 15, said forming die holders being disposed in edge abutting relation in said upper flight of the chain of forming die holders, and said pulp vat having an extended horizontal bottom plate in substantial fluid sealing and sliding engagement with the upper surfaces of said forming die holders.

21. A pulp molding machine as defined in claim 15 including sealing members between said flights of forming die holders and transfer die holders and their suction boxes, said die holders and sealing members having registering suction apertures, means on a transverse axis through said suction apertures for connecting each die holder with its sealing member to maintain registry of said suction apertures, pairs of endless chains disposed on opposite sides of said forming die holders and transfer die holders, and pivotal connections between said chains and die holders on said transverse axis through the suction aperture of each die holder.

22. A pulp molding machine comprising an endless chain of forming die holders arranged for travel in one direction in a straight and level upper flight of the chain above a lower return flight, a pulp vat having a bottom opening in sealing engagement with said die holders at one end of said upper flight for filling said die holders, an endless chain of transfer die holders arranged for travel in said direction in a straight and level lower flight of the chain below an upper return flight, said lower flight of transfer die holders being spaced above the other end of said upper flight of forming die holders, stationary suction troughs communicating with said upper flight of forming die holders and said lower flight of transfer holders, sealing members traveling with said die holders in sliding engagement with said suction troughs, and means for lowering and raising said transfer die holders relative to said lower flight level thereof toward and into cooperative engagement with and away from said forming die holders during travel of said transfer die holders over said forming die holders.

References Cited in the file of this patent

UNITED STATES PATENTS

| | | |
|---|---|---|
| 949,886 | Dunton | Feb. 22, 1910 |
| 1,494,345 | Eaid | May 20, 1924 |
| 1,599,384 | O'Brien | Sept. 7, 1926 |
| 1,979,794 | Chaplin | Nov. 6, 1934 |
| 2,301,892 | Lewis | Nov. 10, 1942 |
| 2,556,237 | Teichmann | June 12, 1951 |
| 2,677,467 | Giorgini | May 4, 1954 |